(12) United States Patent
Deisher et al.

(10) Patent No.: US 10,325,590 B2
(45) Date of Patent: Jun. 18, 2019

(54) LANGUAGE MODEL MODIFICATION FOR LOCAL SPEECH RECOGNITION SYSTEMS USING REMOTE SOURCES

(71) Applicants: Michael Deisher, Hillsboro, OR (US); Georg Stemmer, München (DE)

(72) Inventors: Michael Deisher, Hillsboro, OR (US); Georg Stemmer, München (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/752,450

(22) Filed: Jun. 26, 2015

(65) Prior Publication Data

US 2016/0379626 A1    Dec. 29, 2016

(51) Int. Cl.
| | | |
|---|---|---|
| G10L 15/07 | (2013.01) | |
| G10L 15/22 | (2006.01) | |
| G10L 15/187 | (2013.01) | |
| G10L 15/32 | (2013.01) | |
| G10L 15/197 | (2013.01) | |
| G10L 15/26 | (2006.01) | |
| G10L 15/30 | (2013.01) | |

(52) U.S. Cl.
CPC ......... *G10L 15/187* (2013.01); *G10L 15/197* (2013.01); *G10L 15/30* (2013.01); *G10L 15/32* (2013.01)

(58) Field of Classification Search
CPC ..... G10L 15/075; G10L 15/30; G10L 15/197; G10L 15/22; G10L 15/187; G10L 15/265; G10L 15/32; G10L 2015/227; G10L 2015/088; G10L 2015/223

USPC ......................................................... 704/232
See application file for complete search history.

(56) References Cited

U.S. PATENT DOCUMENTS

| | | | | |
|---|---|---|---|---|
| 5,255,342 A | * | 10/1993 | Nitta | G06K 9/64 704/200 |
| 7,590,536 B2 | * | 9/2009 | Bates | G10L 15/197 704/231 |
| 7,983,911 B2 | * | 7/2011 | Soufflet | G10L 15/18 704/231 |
| 9,047,868 B1 | * | 6/2015 | O'Neill | G10L 15/197 |
| 9,076,445 B1 | * | 7/2015 | Lloyd | G10L 15/183 |

(Continued)

OTHER PUBLICATIONS

Guoguo Chen, et al., Using Proxies for OOV Keywords in the Keyword Search Task, Center for Language and Speech Processing & Human Language Technology Center of Excellence, The Johns Hopkins University, Baltimore, MD 21218, USA. ASRU 2013, 978-1-4799-2756-2/13/ (C0 2013, pp. 416-421.

(Continued)

*Primary Examiner* — Edwin S Leland, III
(74) *Attorney, Agent, or Firm* — Womble Bond Dickinson (US) LLP

(57) ABSTRACT

A language model is modified for a local speech recognition system using remote speech recognition sources. In one example, a speech utterance is received. The speech utterance is sent to at least one remote speech recognition system. Text results corresponding to the utterance are received from the remote speech recognition system. A local text result is generated using local vocabulary. The received text results and the generated text result are compared to determine words that are out of the local vocabulary and the local vocabulary is updated using the out of vocabulary words.

20 Claims, 6 Drawing Sheets

(56) References Cited

U.S. PATENT DOCUMENTS

| | | | |
|---|---|---|---|
| 2003/0120493 A1* | 6/2003 | Gupta | G10L 15/063 704/270.1 |
| 2007/0276651 A1* | 11/2007 | Bliss | G10L 15/30 704/9 |
| 2010/0145683 A1* | 6/2010 | Schroeter | H04M 1/72522 704/201 |
| 2010/0318359 A1* | 12/2010 | Hamaker | G10L 15/197 704/257 |
| 2012/0215539 A1* | 8/2012 | Juneja | G10L 15/30 704/254 |
| 2013/0132084 A1* | 5/2013 | Stonehocker | G10L 15/30 704/244 |
| 2014/0088967 A1* | 3/2014 | Kawamura | G10L 15/30 704/251 |
| 2014/0278379 A1* | 9/2014 | Coccaro | G10L 15/1822 704/202 |
| 2015/0025890 A1* | 1/2015 | Jagatheesan | G10L 15/32 704/255 |
| 2015/0081288 A1* | 3/2015 | Kim | G10L 15/30 704/231 |
| 2016/0179787 A1* | 6/2016 | Deleeuw | G06F 17/2785 704/9 |
| 2016/0336007 A1* | 11/2016 | Hanazawa | G10L 15/183 |
| 2016/0379626 A1* | 12/2016 | Deisher | G10L 15/30 704/232 |
| 2017/0229122 A1* | 8/2017 | Juneja | G10L 15/30 |

OTHER PUBLICATIONS

Zhenzhen, Kou et al., "Fix it where it fails: Pronunciation learning by mining error corrections from speech logs," in Accoustics, Speech and Signal Processing (ICASSP), 2015 IEEE International Conference on, pp. 4619-4623, Apr. 19-24, 2015.

PCT International Search Report and Written Opinion of the International Searching Authority for International Application No. PCT/US2016/033623, dated Aug. 8, 2016, 13 pages.

\* cited by examiner

LANGUAGE MODEL MODIFICATION FOR LOCAL SPEECH RECOGNITION SYSTEMS USING REMOTE SOURCES

FIELD

The present description pertains to speech recognition for connected devices and in particular to speech recognition using both local and remote resources.

BACKGROUND

Cellular telephones and motor vehicles have long offered speech recognition systems for hands free operation, for navigation, and for controlling entertainment systems. These systems have suffered from the difficulty of understanding multiple languages, dialects, vocabularies, and pronunciation styles. Poor diction and background noise make speech recognition even more difficult. Some devices operate well by only recognizing a few statements. In some cases, the list of possible statements is displayed on a screen or recited audibly to the user by the system. The user makes one of the statements and then the device repeats the statement for confirmation.

With the advent of data connectivity for smart phones and the Internet of Things, large and powerful servers coupled to substantial databases are available to connected devices. This allows for much better recognition for more languages and more words. Newer products allow users to not only speak to their smart phone, television, and gaming console, but also to watches, fitness sensors, glasses and other portable and wearable devices.

With the increased use and variety of handheld and wearable communications devices, speech understanding and audio quality have become increasingly important. Many handheld and wearable devices receive speech and other audio and send the captured audio to a remote server. The remote server converts the speech to text or commands and sends it back to the connected device. This allows the speech to be used for voice commands. Cloud speech recognition systems are designed to provide good accuracy independent of the acoustics, vocabulary, and grammar of the user. Systems implemented in the cloud can use very large acoustic and language models to meet this goal and can update models frequently.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Notwithstanding the availability of remote connections, server-based automated speech recognition systems have at least four shortcomings. First, the network may not always be available. Second, a network radio such as Wi-Fi or cellular uses power, reducing battery life for a portable device. Third, some users may want to avoid sending text, commands, calendar, and contact information to a server for privacy reasons. Fourth, interposing two-way communication and server processing may slow down the user interface. However, when the device is not using the powerful server system, the speech recognition user experience is degraded. This is because of the limited local resources on the client device. This includes limited client processing capability and memory limitations.

Cloud speech recognition systems can use very large acoustic and language models update models frequently. Large server systems with a large database of clients can also use predictive systems to start processing a speech utterance before it is completed. Very common questions can be answered very quickly. Even if uncommon questions take longer, the user experience is mostly improved. For a client system, it is usually sufficient to provide good accuracy to a single user speaking a single language and dialect and having a similar style of pronunciation and diction. This reduced variety allows a compact client model to be constructed with a smaller amount of memory that performs as well or better for a single or a few users than does a large user-independent model in the cloud. Even when a device has multiple users, since they are often related by geographic location, workplace, or family, the client model may still remain very small.

One or more ASR (Automated Speech Recognition) systems in the "cloud" may be used to improve the accuracy of a client speech recognition system. Cloud speech recognition may be done parallel with client speech recognition and results may be compared. Words that are Out-Of-Vocabulary (OOV) for the client device may be identified by the cloud ASR and added to the client lexicon. This may be done using a dynamic vocabulary mechanism or using opportunistic model rebuilding.

The client system may be further enhanced by confidence mechanisms. User behavior in response to cloud recognition results may be used to estimate a confidence for the accuracy of a particular cloud speech recognition system. The client device's local language model n-gram frequencies or neural network weights may be updated to reflect high confidence user utterances. In addition, the language model may be pruned and grown based on these updated weights. This allows the local memory to be increasingly better tailored to the actual users of the device. The language model may then stay within the client device's memory size constraints. In addition, the local processors are able to provide faster results using a more compact and relevant language model.

Figure 1:
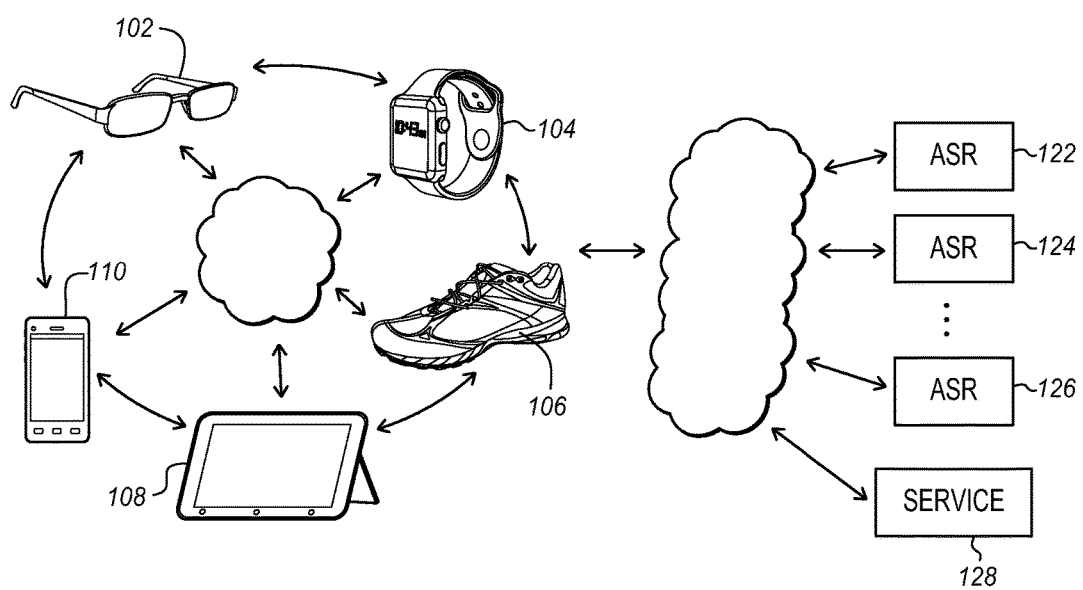
FIG. 1 is a block diagram of a system of connected devices with access to remote resources according to an embodiment.

FIG. 1 is a diagram of a connected device system in which a variety of different user devices communicate through the cloud to various servers and service providers. On the client device side, there is a wearable device such as glasses or a headset 102, a watch 104, a wearable fitness sensor in a shoe, strap, or other article of clothing 106, a computing tablet 108, and a portable handset 110 such as a smart phone, navigation device, fitness device, etc. The client side may also include media players, televisions, set-top boxes, gaming devices, computers, workstations, and other devices. These devices all may communicate with each other as suggested by the arrows using a local networking system, such as Wi-Fi, Bluetooth, or another wired or wireless protocol. The devices also communicate either directly or through another one of the devices through a wider area network 112, such as a WAN (Wide Area Network), MAN (Metropolitan Area Network), LAN (Local Area Network), the Internet or any other suitable communications system.

On the service side there may be one or more Automated Speech Recognition systems 122, 124, 126, or other similar voice recognition and command systems. There may also be numerous service providers 128. These service providers may serve by purchasing tickets or other items, updating cloud-based or local device scheduling, calendaring or other storage systems, sending communications to other users, and in other ways.

Figure 2:
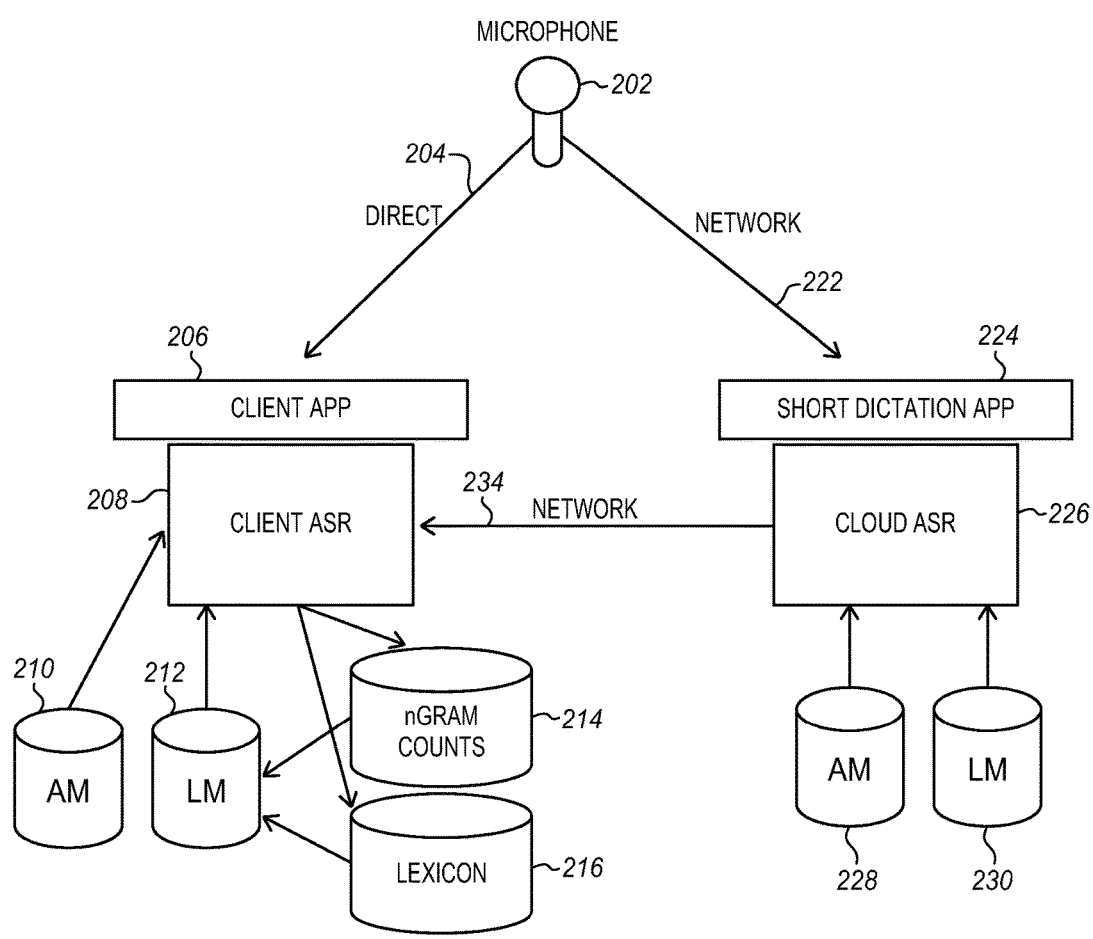
FIG. 2 is a block diagram of operation of the connected devices of FIG. 1 according to an embodiment.

FIG. 2 is a diagram of the operation of any one or more of the client devices of FIG. 1 in cooperation with one or more ASRs or similar services. In the example of FIG. 2, the client device has a microphone 202. The microphone receives an utterance from a user (not shown). Typically, the microphone converts the utterance to a digital form for transmission to other devices and through the network, however, this is not required. There is a direct path 204 from the microphone to a client application 206. This path may be within a single client device, for example from a built-in microphone on a headset or a watch to a processor on the same device, or it may be from one client device to another. The client application 206 accesses a client device automated speech recognition (ASR) system 208 to analyze the utterance. The ASR may be part of the client app 206 or it may be separate module accessed using an application programming interface, operating system calls or in any other desired way.

The speech utterance is also conveyed from the microphone through a network path 222 to one or more remote short dictation applications 224 coupled to corresponding remote ASRs 226, such as a cloud ASR. The network path may be through the same or another client device. As an example, a watch may send voice commands to a smart phone which sends the captured utterance to various servers through a cellular or Wi-Fi link to the internet. A headset may do the same or send the commands to a fixed gaming system which is connected to a wired internet connection to remote servers. A variety of different paths may be used. In some cases, wearable and other devices have a built-in connection to remote networks or servers and these may be used directly.

The client ASR 208 may be connected to and access a variety of different resources such as an acoustic model 210, and a language model 212. The language model may be connected to and access a database of N-gram counts 214, including bigrams, trigrams, and higher count grams, and a lexicon 216. The language model may have many additional resources, depending on the particular implementation. The client device ASR uses these tools to generate a text result corresponding to the utterance received at the microphone. This utterance may then be used by the client app as commands or information. The commands may be for storing data, adding or changing records in contact, calendars, notes or other systems. The commands may be for sending messages to other users or to perform transactions on other systems. The commands may also be to operate components of the client device or another connected device.

The cloud ASR may also be connected to and access an acoustic model 228 and a language model 230 to generate a text result for the utterance. In general the acoustic model and language model is significantly larger and able to interpret significantly more different utterances from more varied users. The generated text result is sent back to the client device through the same or another network path 234. As shown this result is received directly at the client device ASR for use in making a determination of the final text result using both the locally generated text and the remotely generated text result. The result may be received by the same device that houses the ASR, by another connected device or in any other way. The text result will be transferred to the client device ASR through a software stack that recognizes the active client application 206. The client application will receive the final selected text result from the local ASR for the utterance.

The client ASR compares the received text result and the generated text result to determine a final result and then provides the final result to the client application. The client application then performs an action based on the final text result. This may be an action performed by the client device or the action may be to send the final text result to another application, module, or device. While only one remote ASR is shown for simplicity, more than one remote ASR may be used and the client ASR may combine these to obtain better, faster, or more accurate results. The client ASR may also compare results to determine which remote ASRs provide the best results and then select those in favor of other ASRs that provide worse results.

Using several cloud ASR systems will increase local power consumption and could increase the delay experienced by the end user. This will make the device respond more slowly to any spoken utterance. In some embodiments, the local device uses the results from a cloud ASR directly without any comparison or local ASR. This may provide higher accuracy at the cost of some delay for the remote communication. In some embodiments, the device uses only the locally generated results. This provides a quicker response. In such cases, the cloud ASR results may be used for improving the client ASR instead of for responding to the user speech utterance. The process of improving the client ASR, as described herein may use additional power beyond what is required to respond to the utterance. As a result, this process may be turned off when the device is in a power saving mode, whether to conserve power or when battery levels are low. As a further power-saving measure the remote cloud access may be turned off, even when a remote connection is available.

Figure 3:
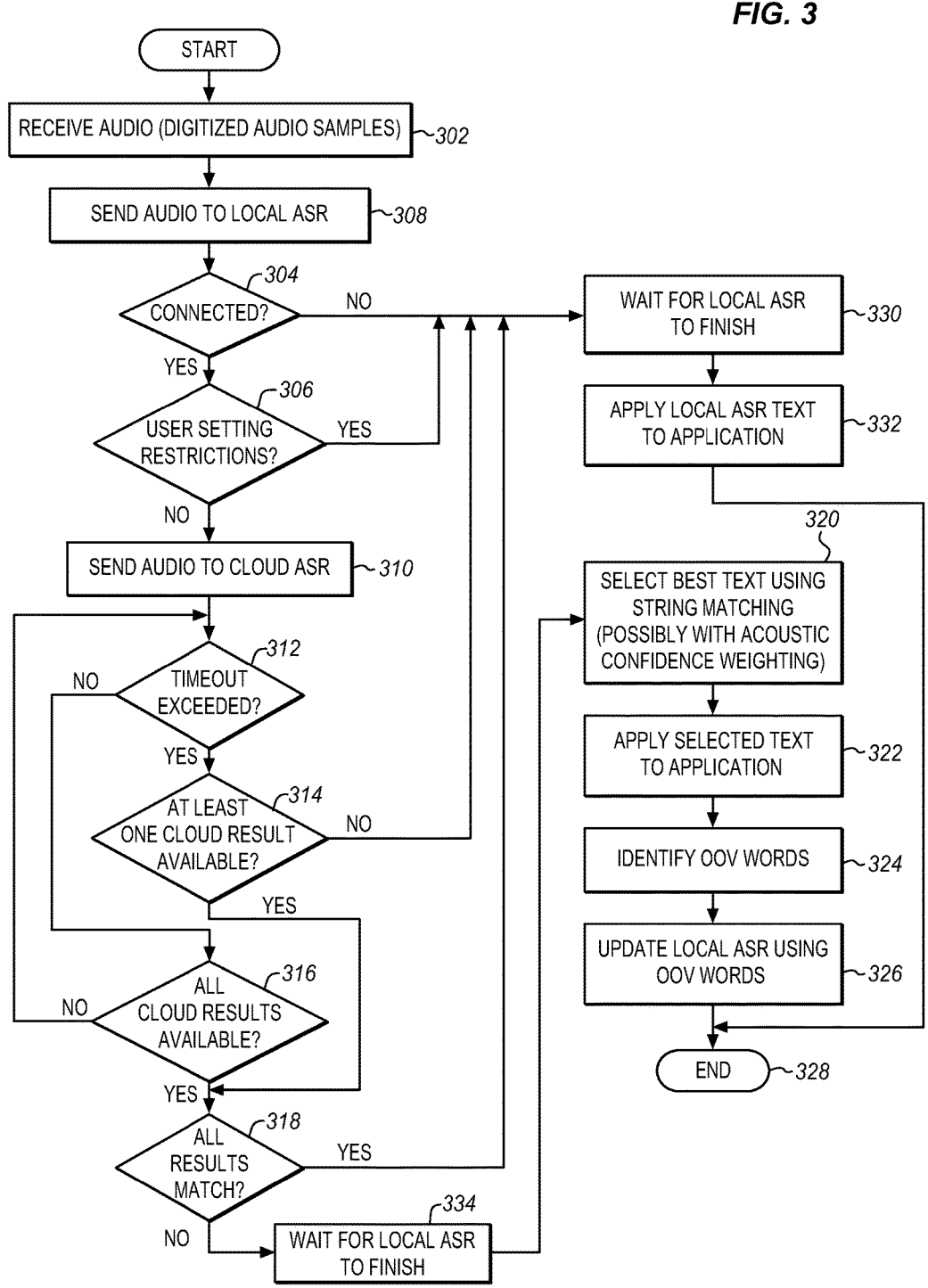
FIG. 3 is a process flow diagram of recognizing speech and updating a local speech recognition system according to an embodiment.

FIG. 3 is a process flow diagram of recognizing a speech utterance and updating a local speech recognition system according to an embodiment. Such a process may be implemented using the hardware of FIG. 2 and variations thereof, inter alia. At 302, a speech utterance is received. This is typically in the form of digitized audio from a local microphone. However, the speech utterance may be received in other ways. The speech utterance may be packetized and provided to a buffer by an audio processing pipeline. The audio of the utterance may be recorded into a buffer or longer term memory at the local device for further analysis. At the buffer, it is available to a main processor or to a separate speech recognition system. In order to interpret and speech utterance, the system will use one or more automated speech recognition systems.

At 308, the audio of the speech utterance is sent to the local ASR. This operation may be performed every time for any speech utterance in order to use local results. However, if cloud ASRs are available, then they may be used instead and this operation may be skipped.

At 304, the system determines whether it is connected to a network. The system may not be connected because there is no network available or because the network interface is not available. The network interface may be turned off to save power or to prevent interference caused by transmissions such as in an "airplane" mode or for any other reason. If there is no network connection, then the system performs a local ASR and at 330 waits for the local ASR to finish. After the local ASR is finished, then this result is applied locally to the appropriate application at 332. The system is operating autonomously using the available local ASR.

If there is a network connection, then the system still performs a local ASR at 330 as it continues to evaluate connections and remote ASR operation. As an alternative, the system may be configured to use only remote ASRs if remote ASRs are available. As another alternative, the system always performs a local ASR at 330 and uses the result for the application at 332. Cloud results, if any, are used only for updating the local ASR at 326.

Similarly at 306, the system determines whether there are any user settings to restrict network connections. The system may be set not to use a network connection even when such a connection is available. This may be for privacy purposes, to reduce data transmission, to conserve battery power, or for any other reasons. In some embodiments, the system is configured to primarily rely on the local ASR in the user setting restrictions. The cloud ASRs are used only in certain specified circumstances. In one example, the system may be set to use only Wi-Fi connections and not to use cellular telephone connections in order to reduce data costs. Alternatively, the system may be set to not use Wi-Fi connections for security or privacy purposes. If there are restrictions on the use of the data network, then the system performs a local ASR at 330 and uses the results for the active application at 332. The local ASR converts the speech utterance to text and this text is used by the active application as data, command, or in any other way, depending on the nature or the active application.

If a network connection is available and there are no restrictions on use of the network, then at 310, the system sends the audio to one or more network connected ASR's. These systems will be referred to as the cloud ASR's, however, they may be accessible through any of a variety of different types of network connection and may be internal or external resources for a network or other system. The cloud ASRs, like the local ASR, analyze the speech utterance as one or more digitized audio samples and then generate some type of machine recognizable data. Typically the data is a text sequence but could be in any of a variety of other forms.

The remote speech recognition systems may be selected based on pre-determined parameters, user selection or based on past performance. The ASR systems that provide the best results may be returned to for later utterances. In this way the local device is optimized for the particular users and for the available resources which may change over time.

The cloud ASR interaction may be managed using different tests. First at 312, there is a timer. When the timer times out then the system determines whether all of the cloud ASR results are available at 316. If the cloud ASR results are all available then the system determines whether the cloud ASR results all match at 318. If the cloud results all match then the system proceeds at 330 to wait for the local ASR results. After these are received, then at 332 the local ASR-generated text is used by the application and the speech recognition process ends. If the results do not match, then the system retrieves the local ASR results at 334 and then selects the best text at 320.

If the timer has not timed out, then the system may still determine whether all of the cloud ASR results have been received at 316. If they have all been received, then the system may proceed to determine whether they all match at 318. If the results have not all been received at 316 and the timer has not expired at 312, then the system continues to wait until the timer expires before operating on the cloud ASR results.

After the timer expires at 312 or if all of the results have been received at 316, then all of the cloud ASR results that have been received may be compared at 318. The text results received from the remote speech recognition system correspond to the original user speech utterance. While the selected remote ASRs are working, the local ASR may also generate a text result corresponding to the utterance at 334. The local ASR then compares the received text results and the generated text result. These results may be combined based on the comparison to determine a final text result for the utterance at 320. The final result may then be used by a client application at 322 as a command, as data, or in a variety of other ways.

In addition the final result may be used to update the local acoustic model and the local language model at 326. When the received remote ASR results do not match, then at 320 the best text string is selected or created using acoustic confidence weighting or in some other way. In some circumstances, whether the cloud ASR results match or not, the remotely received text result may or may not be used by the client application if the local speech recognition result confidence is high. In addition, there will be no remote text results unless the privacy permissions at the client device allow the speech utterance to be sent in each particular context. If the local and remote cloud speech recognition results differ, then the differences are analyzed. This may be done in a local phone recognition lattice or any other analysis system available to the local ASR.

At 320, if the cloud ASR results are to be used by the application, then the best text string between the cloud ASR and the local ASR results is selected. This may be done with acoustic confidence weighting or any other desired type of scoring. In some cases, in order to provide a faster response, the local ASR result is used regardless of the cloud ASR results. At 322 once a text result is selected, then this result is applied to the active application.

At 324, given the local ASR and the cloud ASR results, out of vocabulary (OOV) words are identified. That is the system examines the local and cloud results to determine if there are any words in the cloud ASR results which are not in the local ASR. At 326, if any OOV words are found, then when appropriate the local ASR is updated at 326 using the identified OOV words. The system then ends the process at 328 until another speech utterance is received at 302.

Figure 4:
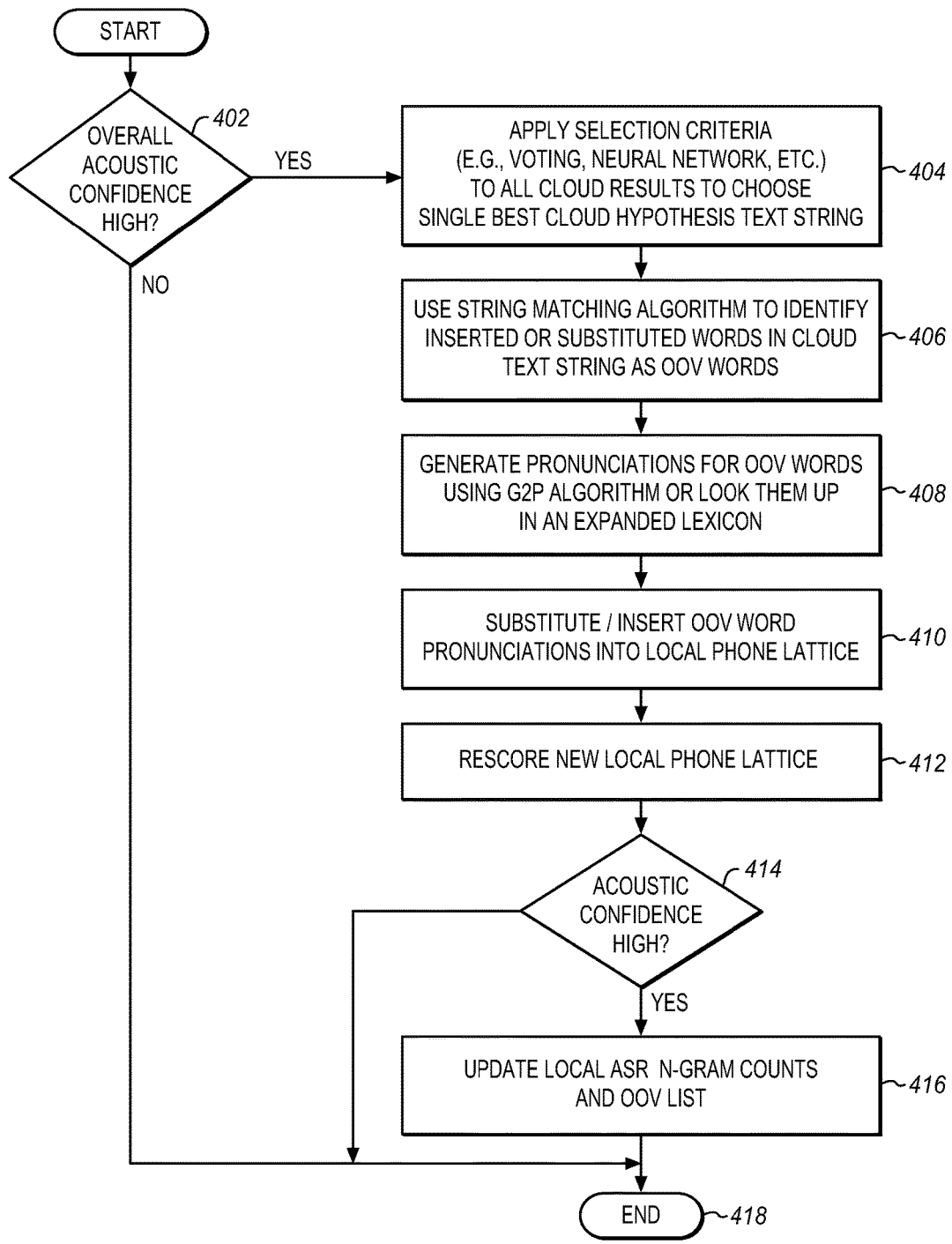
FIG. 4 is a process flow diagram of identifying out-of-vocabulary words at a local speech recognition system according to an embodiment.

FIG. 4 is a process flow diagram of how OOV words may be identified according to some embodiments. FIG. 4 shows an example of how the operations at 324 may be performed. By adding OOV words to the local ASR, the quality of the results produced by the local ASR may be improved using the remote resources. The language model, acoustic model, n-gram counts, and the lexicon, as well as any other appropriate resources of the local ASR may be augmented by the cloud ASR results. The improvement of the local ASR may be done after the ASR results are provided to the active application in a background process. The improvement may also be done only when there is sufficient battery power. This improvement process is only done when remote ASR results are available. As mentioned above, the remote ASR results may or may not be used in the speech recognition process. The system may use local ASR for speech recognition and then use the remote results only to improve the local ASR by adding OOV words and any other desired data.

Different processes may be used, depending on the circumstances. If there is only one cloud ASR system available for results. Then the results from that one cloud system may be assumed to be the single-best hypothesis. Depending on settings and delay, this hypothesis may also be applied to the active application. If there is more than one cloud ASR result available, then voting or other methods may be used to either choose one of the results or to construct one single-best hypothesis from the received results. Multiple candidate text strings may be constructed using combinations of the results to then select the best single text string.

Referring to FIG. 4, at 402, the received speech utterance is evaluated to determine an acoustic confidence level. This test may be used as a gate test to determine whether the utterance should be used for enhancing the local ASR. Any of a variety of different acoustic confidence scoring techniques may be used such as normalized acoustic likelihood, posterior probability, spread of n-best scores, etc. If the acoustic confidence is too low, then there may be an error in the received utterance due to noise, interference, or some other muffling or blocking effect. In some cases, the received acoustics may be clearly received, however, there is no suitable match in the language model. Such an acoustic confidence score may also be used in an ASR system to reject a user speech utterance and request that the user repeat the utterance before any further voice recognition processing is performed. In that case, the confidence required to require the user to repeat the utterance may be much lower than the confidence required to use the utterance to determine OOV words.

If the acoustic confidence is too low for the local ASR enhancement then the process ends at 418. If the acoustic confidence is sufficiently high then at 404 selection criteria are applied to all of the cloud results to select the best one. If there is only one cloud ASR result, then this is used and selected as the best. With multiple received text strings from the cloud ASR's, the evaluations may include voting, neural networks and other evaluation systems.

The determination of high or low may be done using one or more thresholds. There may be a low threshold so that if the result is below the threshold then the results are rejected. There may be a high threshold so that if the results are above or exceed the high threshold, then the results are used to possible update the local ASR. If the acoustic confidence is between the thresholds, then the system may return a speech recognition result but not modify the local ASR. Different threshold configuration and application systems may be used depending on the particular implementation.

At 406, the selected cloud text string is compared to the local ASR text string to determine whether there are any words in the cloud text string that are not in the local text string. In some audio speech samples, it is not always clear where one word ends and the next begins. For this and other reasons, differences between the cloud and local text strings may not be due to a difference in lexicons, but due to a difference in interpreting the utterance as words. String matching algorithms and other techniques may be used to identify differences in the words between the two text strings. This may be done using standard insertion or substitution identification algorithm, such as NIST (National Institute of Standards and Technology) sctk (scoring toolkit) or a variety of other techniques. A proper substitution from the cloud string into the local string may be identified as an OOV word in the local ASR.

In some embodiments, the identified OOV words cannot be directly added into the lexicon because their true pronunciation is not known. At 408 pronunciations are generated for the identified OOV words. This may be done using a grapheme to phoneme (G2P) algorithm or the pronunciations may be looked up in a lexicon. These pronunciations may be inserted into a local phone lattice. At 412, the revised local phone lattice may then be scored again using the substituted words. This is another acoustic scoring in which the local phone lattice built from the text string is compared to the audio received from the user.

If the acoustic score for the new text string is low, then the results are rejected. In some embodiments, the process ends as shown. In other embodiments, the local phone recognition lattice is used to resolve pronunciation ambiguities. Different words from the remote text string may be substituted into the local text string to generate different candidate text strings. These possibilities for the local text string are scored and the one with the highest score is selected. If the acoustic confidence is still too low, then the process ends. The local ASR is not changed.

On the other hand, if the acoustic confidence score is high, either with a single text string or with one selected from multiple candidates, then the local ASR may be improved. Different aspects of the local ASR may be modified, depending on the nature of the local ASR and the particular implementation. In some embodiments, as shown at 416, the n-gram counts and the local lexicon is enhanced by adding the newly identified OOV words from the new text string. The n-gram counts may be used for future language model updates, among other purposes.

In some embodiments, the update of local ASR may be deferred. The update may be done at the client when resources allow, or the update may be done at a cloud service. A cloud service update may be desired, for example, when the local device is simply too small or too low power to perform the update or to provide central control. In one embodiment, in order to perform the update of the local language model, in the cloud, the OOV list, n-gram counts, any other desired data may be sent to a cloud service. The cloud service may then generate the new models and then transmit them to the client when the network allows. In this way the local device is only writing the new data to its memory instead of making the determinations of proper values for the new data.

Figure 5:
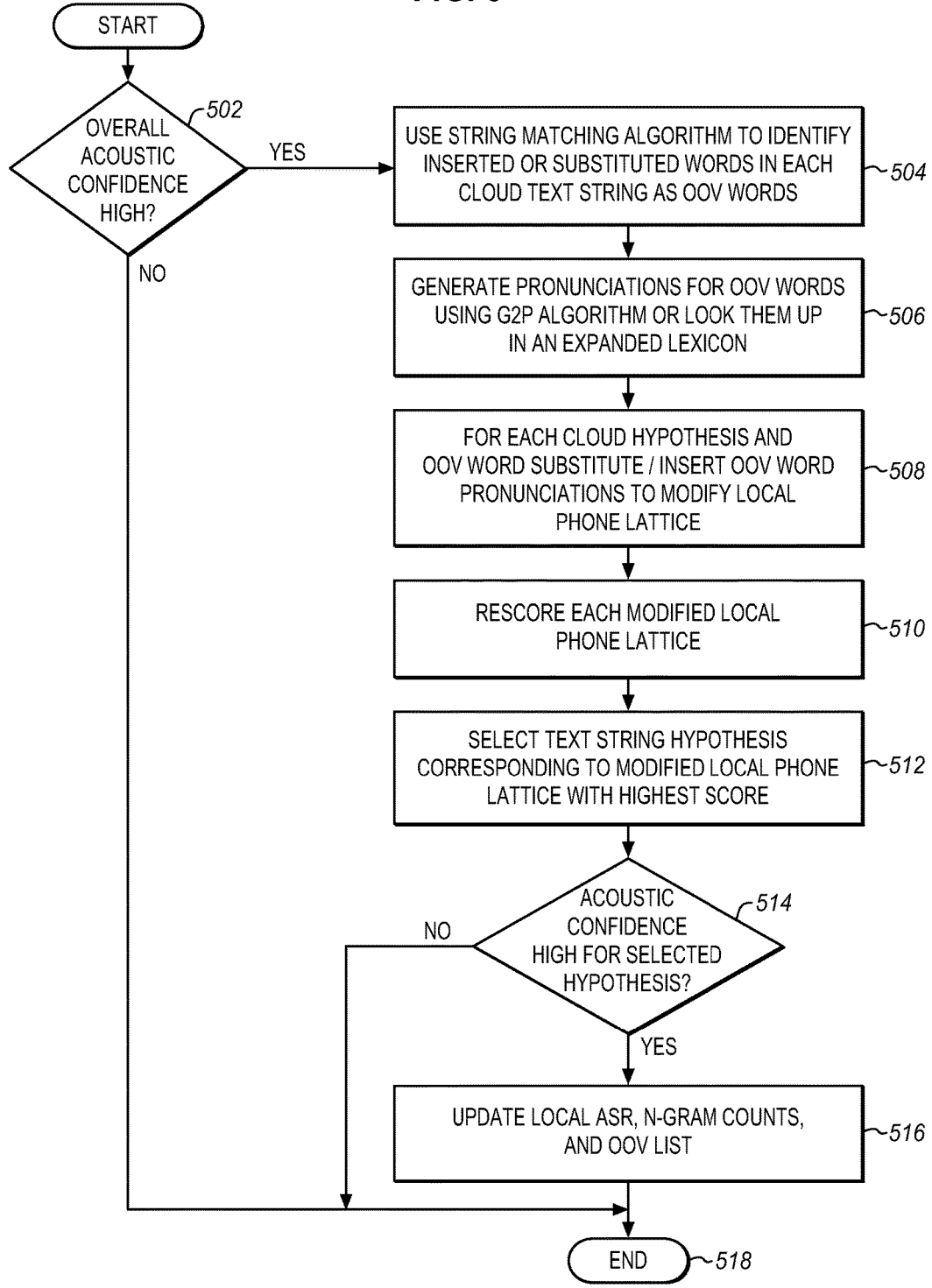
FIG. 5 is a process flow diagram of an alternative for identifying out-of-vocabulary words at a local speech recognition system according to an embodiment.

FIG. 5 is an alternative process for identifying OOV words and then augmenting the local ASR using the identified words. In the example of FIG. 5, more than one remote or cloud ASR has provided a text result and the result are, at least in some cases, different from each other. As in the previous example, the acoustic confidence of the original speech utterance may be assessed at 502. If the confidence is too low, then the process ends at 518. If the confidence is sufficiently high, then at 504, a string matching algorithm is used to identify words in each text string that may be OOV words. As mentioned above, high or low may be evaluated using numerical thresholds or in any other desired way. There may be one or multiple thresholds, depending on the particular implementation.

Because there are multiple different text strings, there are more candidate words to consider. String matching and other types of techniques may be used to identify the differences between the strings. The inserted or substituted words in each cloud text string may then be identified as possible OOV words.

At 506 pronunciations may be generated for these identified OOV words. As mentioned above, this may be done using G2P or a lexicon or in any other desired way. At 508, each different text string or hypothesis from the cloud ASRs may be tested by lattice rescoring or in any of a variety of other ways. Substitution or insertion of OOV words from the various cloud text strings into the local text string may be used to form multiple candidate text strings. In some embodiments, this may be done with a phone lattice that includes all of the possible variations. The phone lattice may be used by substituting or inserting OOV word pronunciations into the local phone lattice to modify the local phone lattice to generate multiple cloud hypotheses.

At 510, the newly modified local phone lattice is rescored for each variation within the lattice. Alternatively, various candidates may be generated by substitution and each scored using an acoustic confidence score. Alternatively, based on this scoring, a text string can be selected as the best candidate. This may be a particular text string received from the cloud or it may be a combination of different text strings received from different cloud ASRs.

At 512 the text string hypothesis with the highest score is selected. Using the local phone lattice, each hypothesis of the modified local phone lattice will be tested against the actual utterance by scoring and the hypothesis with the highest score will be selected. In one embodiment, the cloud ASRs are only used to substitute low scoring words in the local ASR result with words from the cloud ASRs. In another embodiment, only the cloud ASRs are used to form the hypotheses. A phone lattice allows many different hypotheses to be tested through the single lattice structure.

At 514, the acoustic confidence for the highest scoring candidate text string is evaluated. If the confidence is too low, then the process ends and the local ASR is unchanged. If the confidence is sufficiently high, then at 516 the local ASR may be updated for the OOV words as described above. This may include updating the n-gram counts for a later language model update, updating the OOV list for a later lexicon update, and updating other features.

When updating the local ASR at 416 or 516, a variety of different techniques may be used. The final result in either process results in one or more OOV words being identified. These final results may be used to update the local acoustic model and the local language model, inter alia. As mentioned above with respect to 416, the updating may be deferred based on power or other system usage. The updating may also be performed using a cloud service to actively determine the updates.

In some embodiments, the local acoustic model 210 and the local language model 212 are pre-installed for each market and are never changed except with other general updates. In some embodiments, the acoustic model and the language model including the lexicon are updated using the received text results from the remote ASRs. In this way, the original data is updated based on new data and results.

The client lexicon and the language model may be augmented using a cached LM technique or by interpolation. The lexicon may be updated directly, for example by rebuilding a HCL (Hidden Markov model Context model Lexicon grammar) in a WFST-based (Weighted Finite State Transducer) system. In some embodiments, the lexicon is updated indirectly using dynamic vocabulary mechanisms.

In addition to updating the lexicon, the language model may also be rebuilt using user-specific client data (e.g. n-gram counts) from the final text results. This may be done at other times, when the ASR resources are not being used for speech recognition in order not to interfere with perceived speed. In addition, after the language model has been updated, the acoustic model may also be rebuilt when resources are available using alignments produced with the updated language model.

The local lexicon is updated with these OOV words that are remotely received. The n-gram frequencies are also updated. After some use, if there are some words that are not used or are used only infrequently by the device users, then these may also be removed from the local lexicon and the language model.

Figure 6:
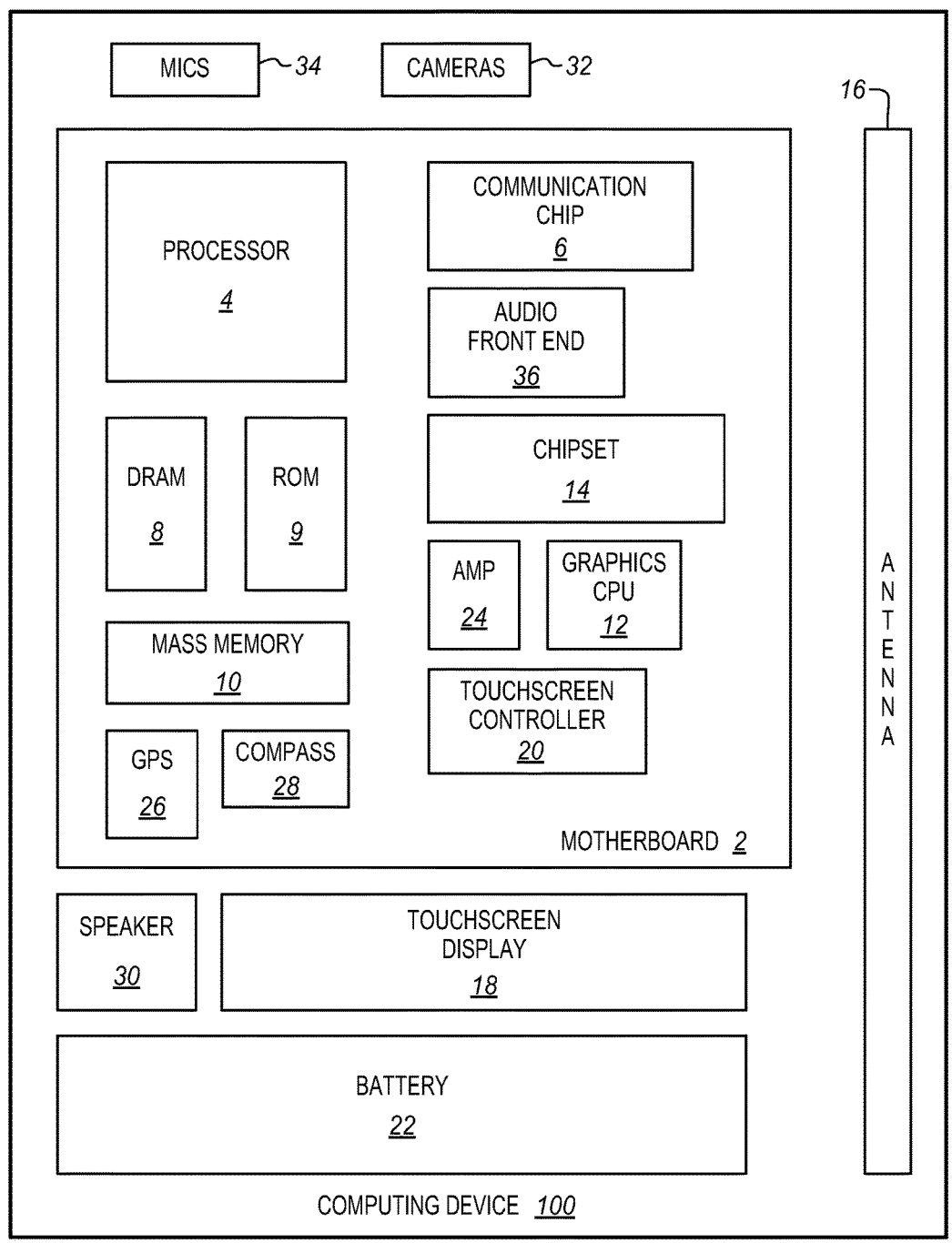
FIG. 6 is a block diagram of a computing device incorporating speech recognition and local speech recognition enhancement according to an embodiment.

FIG. 6 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The microphones 34 and the speaker 30 are coupled to an audio front end 36 to perform digital conversion, coding and decoding, and noise reduction as described herein. The processor 4 is coupled to the audio front end to drive the process with interrupts, set parameters, and control operations of the audio front end. Speech recognition processing may be performed in the communication package 6, the processor 4 or in any other device.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a speech utterance at a local device, sending the speech utterance to at least one remote speech recognition system, receiving a text result corresponding to the utterance from the remote speech recognition system, generating a text result corresponding to the utterance at the local device using a local language model including a local vocabulary in a local lexicon, comparing the received text result and the generated text result to determine words that are out of the local vocabulary, and updating the local language model using the out of vocabulary words.

Further embodiments include combining the generated and received text results based on the comparison to determine a final text result for the utterance and determining the out of vocabulary words using the final text result.

In further embodiments combining comprises using a phone lattice on the local device if the generated and the received text results differ.

In further embodiments comparing comprises applying a neural network.

Further embodiments include determining an acoustic confidence value for the generated text result at the local device and applying voting to the generated and received text results if the acoustic confidence value exceeds a threshold to determine a text candidate for each word.

In further embodiments combining the generated and received text results comprises selecting a word from the client device lexicon unless a respective word is not available in the client device lexicon.

In further embodiments comparing comprises scoring words in the generated and received text result and substituting words from the received text result into the generated text result based on the scores.

In further embodiments comparing comprises inserting different words from multiple received remote cloud text strings into a phone lattice and scoring the phone lattice for each combination.

In further embodiments updating the language model comprises updating the client device lexicon using the received text results.

In further embodiments updating the local language model comprises updating using out of vocabulary words from the final text utterance.

In further embodiments updating the local language model further comprises updating n-gram counts of the local language model.

Further embodiments include determining a speech recognition confidence value for the received text result, comparing the speech recognition confidence value to a threshold and not updating the local vocabulary if the speech recognition confidence value for the received text result does not exceed the threshold.

Further embodiments include determining at the client device whether the device is connected to a remote network and wherein sending the audio utterance is performed only if the device is connected to a remote network.

Further embodiments include conditionally sending the speech utterance to a remote speech recognition system based on user privacy permissions for the local device.

Some embodiments pertain to an apparatus that include a buffer of a local device to receive and record a speech utterance, a network interface to send the speech utterance to at least one remote speech recognition system and to receive a text result corresponding to the utterance from the remote speech recognition system, a processor to generate a text result corresponding to the utterance at the local device using a local language model including a local vocabulary in a local lexicon, to compare the received text results and the generated text result to determine words that are out of the local vocabulary, and to update the local language model using the out of vocabulary words.

In further embodiments updating the local language model comprises updating the local lexicon and n-gram counts of the local language model using the received text results.

In further embodiments the processor is further to determine an acoustic confidence value for the generated text result at the local device, and to apply voting to the generated and received text result if the acoustic confidence value exceeds a threshold to determine a text candidate for each word.

Some embodiments pertain to a computing system that includes a microphone, a buffer of a local device to receive and record a speech utterance from the microphone, a local speech recognition system to convert the speech utterance to a text result using a local language model including a local vocabulary in a local lexicon, a client application to receive the text result as a command, a network interface to send the speech utterance to at least one remote speech recognition system and to receive a text result corresponding to the utterance from the remote speech recognition system, a processor to compare the received text results and the local text result to determine words that are out of the local vocabulary, and to update the local language model using the out of vocabulary words.

Further embodiments include combining the generated and received text results based on the comparison to determine a final text result for the utterance and determining the out of vocabulary words using the final text result.

In further embodiments comparing comprises inserting different words from multiple received remote cloud text strings into a phone lattice and scoring the phone lattice for each combination, and substituting words from the received text result into the generated text result based on the scores.

What is claimed is:

1. A method for a local device having a local speech recognition system comprising:
   receiving, by the local speech recognition system, a speech utterance at a local device;
   sending, by the local speech recognition system, the speech utterance to at least one remote speech recognition system;
   receiving, by the local speech recognition system, a remote intermediate text result corresponding to the utterance from the remote speech recognition system;
   generating, by the local speech recognition system, a local intermediate text result corresponding to the utterance at the local device by analyzing the utterance against a local language model including a local vocabulary in a local lexicon;
   generating, by the local speech recognition system, a final text result by comparing the remote intermediate text result and the local intermediate text result including by inserting different words from the remote intermediate text result into the local generated intermediate text result to form a plurality of different candidate text strings that combine the local and remote intermediate text results, scoring the strings, and selecting a candidate text string based on the scoring as the final text result;
   using, by the local speech recognition system, the selected text string as a command in an application of the local device;
   determining, by the local speech recognition system, words that are out of the local vocabulary by comparing the final text result to the local intermediate text result; and
   updating, by the local speech recognition system, the local language model using the determined words; and
   generating, by the local speech recognition system, a new local intermediate text result using the updated local language model upon receiving another speech utterance at the local device.

2. The method of claim 1, further comprising combining, by the local speech recognition system, the local and remote intermediate text results based on the comparison to determine a final text result for the utterance and determining the out of vocabulary words using the final text result.

3. The method of claim 2, wherein combining, by the local speech recognition system, comprises using a phone lattice on the local device if the generated and the received intermediate text results differ.

4. The method of claim 3, wherein comparing, by the local speech recognition system, comprises applying a neural network.

5. The method of claim 2, further comprising: determining, by the local speech recognition system, an acoustic confidence value for the local intermediate text result at the local device; and
   applying, by the local speech recognition system, voting to the local and remote intermediate text results if the acoustic confidence value exceeds a threshold to determine a text candidate for each word.

6. The method of claim 5, wherein combining, by the local speech recognition system, the local and remote intermediate text results comprises selecting a word from the client device lexicon unless a respective word is not available in the client device lexicon.

7. The method of claim 2, wherein comparing, by the local speech recognition system, comprises scoring words in the local and remote intermediate text result and substituting words from the remote intermediate text result into the local intermediate text result based on the scores.

8. The method of claim 7, wherein updating the local language model, by the local speech recognition system, comprises updating using out of vocabulary words from the final text utterance.

9. The method of claim 3, wherein comparing, by the local speech recognition system, comprises inserting different words from multiple received remote cloud text strings into a phone lattice and scoring the phone lattice for each combination.

10. The method of claim 1, wherein updating the language model, by the local speech recognition system, comprises updating the client device lexicon using the received intermediate text results.

11. The method of claim 1, wherein updating the local language model, by the local speech recognition system, further comprises updating n-gram counts of the local language model.

12. The method of claim 1, further comprising determining, by the local speech recognition system, a speech recognition confidence value for the received intermediate text result, comparing the speech recognition confidence value to a threshold and not updating the local vocabulary if the speech recognition confidence value for the received intermediate text result does not exceed the threshold.

13. The method of claim 1, further comprising determining, by the local speech recognition system, at the client device whether the device is connected to a remote network and wherein sending the audio utterance is performed only if the device is connected to a remote network.

14. The method of claim 1, further comprising conditionally sending, by the local speech recognition system, the speech utterance to a remote speech recognition system based on user privacy permissions for the local device.

15. An apparatus comprising:
a buffer of a local device to receive and record a speech utterance;
a network interface to send the speech utterance to at least one remote speech recognition system and to receive a remote intermediate text result corresponding to the utterance from the remote speech recognition system; and
a processor coupled to the buffer and network interface and configured to implement a local speech recognition system to generate a local intermediate text result corresponding to the utterance at the local device by analyzing the utterance against a local language model including a local vocabulary in a local lexicon, to generate a final text result by comparing the remote intermediate text result and the local generated text result by inserting different words from the remote received intermediate text result into the local intermediate text result to form a plurality of different candidate text strings that combine the local and remote intermediate text results, scoring the strings, and selecting a candidate text string based on the scoring, to use the selected text string as a command in an application of the local device, to determine words that are out of the local vocabulary by comparing the final text result to the local intermediate text result, and to update the local language model using the determined words; and to generate a new local intermediate text result using the updated local language model upon receiving another speech utterance at the local device.

16. The apparatus of claim 15, wherein local speech recognition system is to update the local lexicon and n-gram counts of the local language model using the received text results.

17. The apparatus of claim 15, wherein the local speech recognition system is to determine an acoustic confidence value for the local intermediate text result at the local device, and to apply voting to the local and remote intermediate text result if the acoustic confidence value exceeds a threshold to determine a text candidate for each word.

18. A computing system for a local device comprising:
a microphone;
a buffer of the local device to receive and record a speech utterance from the microphone;
a local speech recognition system to convert the speech utterance to an intermediate text result using a local language model including a local vocabulary in a local lexicon;
a client application to receive the text result as a command;
a network interface to send the speech utterance to at least one remote speech recognition system and to receive a remote intermediate text result corresponding to the utterance from the remote speech recognition system; and
a processor coupled to the buffer, local speech recognition system, client application and network interface and configured to compare the remote intermediate text results and the local intermediate text result to determine words that are out of the local vocabulary by inserting different words from the remote intermediate text result into the local intermediate text result to form a plurality of different candidate text strings, scoring the strings, selecting a text string based on the scoring, to use the selected text string as a command in an application of the local device, to determine words that are out of the local vocabulary by comparing the final text result to the local intermediate text result, to update the local language model using the determined words; and to generate a new local intermediate text result using the updated local language model upon receiving another speech utterance at the local device.

19. The computing system of claim 18, wherein the processor is further configured to combine the local and remote intermediate text results based on the comparison to determine a final text result for the utterance and to determine the out of vocabulary words using the final text result.

20. The computing system of claim 18, wherein the processor is further configured to insert different words from multiple received remote cloud text strings into a phone lattice and scoring the phone lattice for each combination, and substitute words from the remote received intermediate text result into the local intermediate text result based on the scores.

* * * * *